United States Patent [19]

Kuwabara et al.

[11] Patent Number: 4,521,112
[45] Date of Patent: Jun. 4, 1985

[54] OPTICAL MEASURING DEVICE WITH POSITION INDICATOR

[75] Inventors: Yoshiharu Kuwabara; Hiroyoshi Hamada; Masayuki Kuwata, all of Kanagawa, Japan

[73] Assignee: Mitutoyo Mfg. Co., Ltd., Tokyo, Japan

[21] Appl. No.: 452,387

[22] Filed: Dec. 22, 1982

[30] Foreign Application Priority Data

Dec. 25, 1981 [JP] Japan ................. 56-215253

[51] Int. Cl.³ ............................................ G01B 11/02
[52] U.S. Cl. ................... 356/375; 356/373; 356/387
[58] Field of Search ............... 356/373, 375, 383, 384, 356/387, 385, 386

[56] References Cited

U.S. PATENT DOCUMENTS 3,730,632  5/1973  Chikama ............................ 356/383
3,922,094  11/1975  Colding et al. .................... 356/375
4,324,982  4/1982  Poulsen ............................. 356/387

Primary Examiner—R. A. Rosenberger
Assistant Examiner—Michael F. Vollero
Attorney, Agent, or Firm—Koda and Androlia

[57] ABSTRACT

An optical measuring device comprising a parallel scanning ray beam generator, condensing means for condensing said parallel scanning ray beams after said parallel scanning ray beams have passed through a workpiece being measured, and a single light receiving element for sensing the brightness of said scanning ray beams condensed by said condensing means to convert the same into an electric signal, whereby the dimensions of the workpiece being measured are measured from the time length of a dark portion or a bright portion generated due to the obstruction of said parallel scanning ray beams by the workpiece being measured, which has been interposed between the parallel scanning ray beam generator and said light receiving element, a plurality of light emitting elements are arranged in opposed relations to the scanning scope of the parallel scanning ray beams, an output from the light receiving element during a single scanning time is time-shorn in accordance with the number of the light emitting elements to thereby cause the light emitting element or elements to emit light in accordance with the position of the workpiece being measured with respect to the scanning scope.

9 Claims, 4 Drawing Figures

OPTICAL MEASURING DEVICE WITH POSITION INDICATOR

BACKGROUND OF THE INVENTION

1. Field of the Invention

This invention relates to optical measuring devices, and more particularly, it is concerned with improvements in an optical measuring device suitable for use in an optical measuring device for measuring dimensions of a workpiece being measured through the utilization of uneasily visible or invisible laser beams, comprising a parallel scanning ray beam generator, condensing means for condensing parallel scanning ray beams after the parallel scanning ray beams have passed through the workpiece being measured, and a single light receiving element for sensing the brightness of the scanning ray beams condensed by the condensing means to convert the same into an electric signal, whereby the dimensions of the workpiece being measured are measured from the time length of a dark portion or a bright portion generated due to the obstruction of the parallel scanning ray beams by the workpiece being measured, which has been interposed between the parallel scanning ray beam generator and the light receiving element.

2. Description of the Prior Art

Heretofore, there has been known a high speed scanning type laser length measuring instrument wherein rotary scanning ray beams (laser beams) are converted by a collimator lens into parallel scanning ray beams being passed through a space between this collimator lens and a condensing lens, a workpiece being measured is interposed between the collimator lens and the condensing lens, and the dimensions of the workpiece being measured are measured from the time length of a dark portion or a bright portion generated due to the obstruction of the parallel scanning ray beams by this workpiece being measured.

As shown in FIG. 1, the length measuring instrument is constructed such that laser beams 12 are oscillated from a laser beam source 10 toward a stationary mirror 14, the laser beams 12 thus reflected by this stationary mirror 14 are converted by a rotary mirror 16 into scanning beams 17, the scanning beams 17 are converted by a collimator lens 18 into parallel scanning ray beams 20, a workpiece being measured 24, which has been interposed between the collimator lens 18 and the condensing lens 22, is scanned at high speed by the scanning ray beams 20, and the dimensions of the workpiece being measured 24 in the scanning direction are measured from the time length of a dark portion or bright portion generated due to the obstruction of the parallel scanning ray beams by the workpiece being measured 24 at that time. More specifically, the dark and bright portions of the parallel scanning ray beams 20 are detected as variations in output voltage of a light receiving element 26 disposed at the focal point of the condensing lens 22, signals from the light receiving element 26 are supplied to a pre-amplifier 28, where the signals are amplified, and thereafter, the signals thus amplified are supplied to a segment selector circuit 30. To measure the time length of the dark portion or the bright portion corresponding to a measuring segment, this segment selector circuit 30 time-shears the output from the light receiving element 26, generates a voltage V to open a gate circuit 32 only for a time t, during which the measuring segment of the workpiece being measured 24 is being scanned, and supplies the same to the gate circuit 32. This gate circuit 32 is supplied with clock pulse CP from a clock pulse oscillator 34, whereby the gate circuit 32 inputs to a counting circuit 36 a clock pulse P corresponding to a time t in accordance with the dimensions of the measuring segment of the workpiece being measured 24. The counting circuit 36, counting the clock pulse P, outputs a counted signal to a digital indicator 38, which digitally indicates the dimensions of the measuring segment of the workpiece being measured 24. Meanwhile, the aforesaid rotary mirror 16 is rotated in synchronism with the clock pulse CP outputted from the clock pulse oscillator 34 by a synchronous sine-wave generator 40 for generating sine waves in synchronism with an output from the clock pulse oscillator 34 and a synchronous motor 44 driven in synchronism with an output from a power amplifier 42, so that the accuracy in measuring can be maintained.

The high-speed scanning type laser length measuring instruments of the type described, because of being capable of measuring the lengths, thickness and the like of moving workpieces and workpieces heated to a high temperature at high accuracy in non-contact relationship therewith, have been widely utilized. However, in general, since a helium-neon laser is used as the aforesaid laser beam source 10, the parallel scanning ray beams 20 become uneasily visible light beams, whereby it has extremely difficult to dispose the workpiece to be measured 24 in portion within the scanning scope of the parallel scanning ray beams 20 or to ascertain whether the workpiece 24 thus disposed is located at the optimum position within the scanning scope. In consequence, as indicated by a broken line in the aforesaid FIG. 1, heretofore, an object of projection 46 such as a piece of paper or a fluorescent screen is interposed between the workpiece being measured 24 and the condensing lens 22 in the light path of the parallel scanning ray beams 20, and judgment is made whether the position of the workpiece being measured 24 is suitable or not from the positions of the parallel scanning ray beams on the object of projection 46. However, with the method of this type using the object of projection 46, it takes much time to ascertain the positions, and moreover, when the object of projection 46 is inserted in the light path of the parallel scanning ray beams 20 in order to ascertain the position of the workpiece being measured 24, it is impossible to simultaneously measure the dimensions of the workpiece being measured 24. Furthermore, it is dangerous to visually ascertain the positions of the parallel scanning ray beams 20 on the object of projection 46, when the output from the laser beam source 10 is large. Further, when a semiconductor laser is used as the laser beam source 10, the parallel scanning ray beams 20 become invisible rays, and hence, it has been disadvantageous in that it is impossible to ascertain the positions of the parallel scanning ray beam 20 on the object of projection 46 even when the object of projection 46 is used.

Meanwhile, it is conceivable to provide an analog monitor meter to indicate the center position of the measuring segment of the workpiece being measured 24 within the scanning scope of the parallel scanning ray beams 20. However, when there are two or more measuring segments of the workpiece being measured 24 or a portion of the workpiece being measured 24 projects out of the scanning scope of the parallel scanning ray beams 20, it is impossible to obtain the center portion of the workpiece being measured 24, thus presenting the disadvantage that no suitable indication of the position can be provided by the analog meter.

SUMMARY OF THE INVENTION

The present invention has been developed to obviate the above-described disadvantages of the prior art and has as its first object the provision of an optical measuring device wherein the position of the workpiece being measured with respect to the parallel scanning ray beams can be readily and accurately found, and consequently, the measurement can be achieved quickly and safely.

A second object of the present invention is to provide an optical measuring device which has achieved the first object with a simplified circuit arrangement.

A third object of the present invention is to provide an optical measuring device which does not require adjusting for the position of the workpiece being measured.

To achieve the first object, the present invention contemplates in that, in an optical measuring device comprising a parallel scanning ray beam generator, condensing means for condensing parallel scanning ray beams after the parallel scanning ray beams have passed through the workpiece being measured and a single light receiving element for sensing the brightness of the scanning ray beams condensed by the condensing means to convert the same into an electric signal, whereby the dimensions of the workpiece being measured are measured from the time length of a dark portion or a bright portion generated due to the obstruction of the parallel scanning ray beams by the workpiece being measured, which has been interposed between the parallel scanning ray beam generator and the light receiving element, the device further comprises setting position display means having a plurality of light emitting elements arranged in opposed relations to the scanning scope of the parallel scanning ray beams and a time shearing circuit for time-shearing an output from the light receiving element during a single scanning time in accordance with the number of the light emitting element of the setting position display means to thereby cause the light emitting elements of the setting position display means to emit light in accordance with the position of the workpiece being measured with respect to the scanning scope.

To achieve the second object, the present invention contemplates in that, in an optical measuring device comprising a parallel scanning ray beam generator, condensing means for condensing parallel scanning ray beams after the parallel scanning ray beams have passed through the workpiece being measured, a single light receiving element for sensing the brightness of the scanning ray beams condensed by the condensing means to convert the same into an electric signal and a segment selector circuit to time-shear the output from the light receiving element for selecting a measuring segment, whereby the dimensions of the workpiece being measured are measured from the time length of a dark portion or a bright portion in the measuring segment generated due to the obstruction of the parallel scanning ray beams by the workpiece being measured, which has been interposed between the parallel scanning ray beam generator and the light receiving element, the device further comprises setting position display means having a plurality of light emitting elements arranged in opposed relations to the scanning scope of the parallel scanning ray beams and a time shearing circuit utilizing the aforesaid segment selector circuit for time-shearing an output from the light receiving element during a single scanning time in accordance with the number of the light emitting elements of the setting position display means to thereby cause the light emitting elements of the setting position display means to emit light in accordance with the position of the workpiece being measured with respect to the scanning scope.

To achieve the third object, the present invention contemplates in that, in an optical measuring device comprising a parallel scanning ray beam generator, condensing means for condensing parallel scanning ray beams after the parallel scanning ray beams have passed through the workpiece being measured and a single light receiving element for sensing the brightness of the scanning ray beams condensed by the condensing means to convert the same into an electric signal, whereby the dimensions of the workpiece being measured are measured from the time length of a dark portion or a bright portion generated due to the obstruction of the parallel scanning ray beams by the workpiece being measured, which has been interposed between the parallel scanning ray beam generator and the light receiving element, the device further comprises driving means for moving the position of a mount base, on which the workpiece being measured is mounted, in the scanning direction of the parallel scanning ray beams, a time shearing circuit for time-shearing an output from the light receiving element during a single scanning time and generating an output in accordance with the position of the workpiece being measured with respect to the scanning scope, and a power amplifier for feedback controlling the position of the mount base by means of the driving means so that the workpiece being measured can come to a predetermined position within the parallel scanning ray beams in accordance with an output from the time shearing circuit.

According to the present invention, even when the parallel scanning ray beams are uneasily visible rays or invisible rays, the position of the workpiece being measured with respect to the scanning scope of the parallel scanning ray beams can be readily and quickly found. In consequence, the workpiece being measured can be easily prevented from projecting out of the scanning scope. Furthermore, in a relative measurement, the workpiece can be easily set substantially at the center portion of the scanning scope. Further, it is safe because of not requiring direct visual inspection of the parallel scanning ray beams themselves.

BRIEF DESCRIPTION OF THE DRAWINGS

The exact nature of this invention, as well as other objects and advantages thereof, will be readily apparent from consideration of the following specification relating to the accompanying drawings, in which like reference characters designate the same or similar parts throughout the figures thereof and wherein.

DETAILED DESCRIPTION OF THE INVENTION

Detailed description will hereunder be given of the embodiment of the present invention with reference to the drawings.

Figure 2:
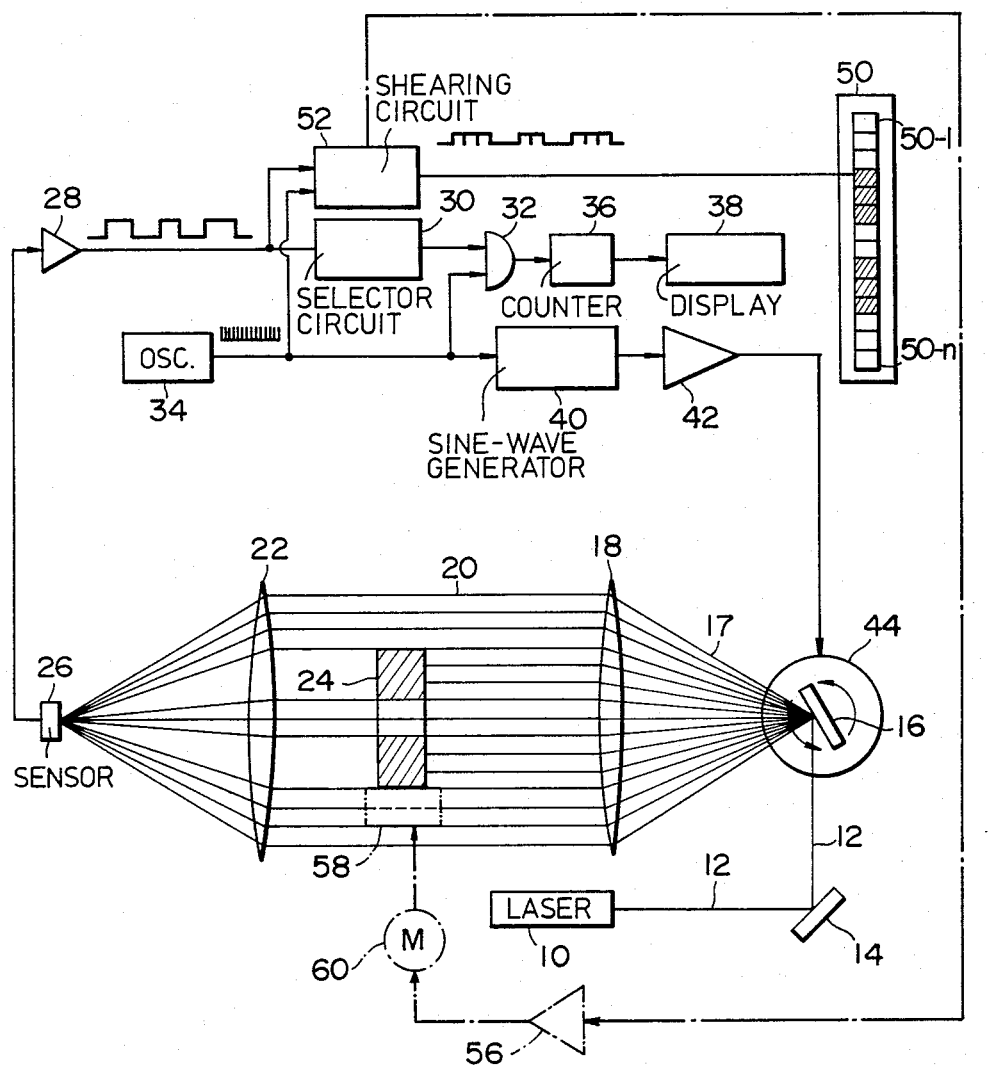
FIG. 2 is a plan view partially including a block diagram, showing the arrangement of an embodiment of the optical measuring device according to the present invention.

As shown in FIG. 2, according to the present embodiment, in an optical measuring device, similar to the conventional example, comprising a laser beam source 10, a stationary mirror 14, a rotary mirror 16, a collimator lens 18, a condensing lens 22, a light receiving element 26, a pre-amplifier 28, a segment selector circuit 30, a gate circuit 32, a clock pulse oscillator 34, a counting circuit 36, a digital indicator 38, a synchronous sine-wave oscillator 40, a power amplifier 42 and a synchronous motor 44, whereby the dimensions of the workpiece being measured 24 are measured from the time length of a dark portion generated due to the obstruction of the parallel scanning ray beams 20 by the workpiece being measured 24 interposed between the collimator lens 18 and the condensing lens 22, the device further comprises a setting position displayer 50 having light emitting elements 50-1~50-n constituted by a plurality (the number n, for example) of indicator lamp, light emitting elements or the like arranged in opposed relations to the scanning scope of the parallel scanning ray beams 20, and a time shearing circuit 52 for time-shearing an output of the pre-amplifier 28 during a single scanning time into the number n in accordance with the number of the light emitting elements of the setting position displayer 50 to cause the light emitting element or elements 50-1~50-n of the setting position displayer 50 to emit light in accordance with the position of the workpiece being measured 24 with respect to the scanning scope. The device is similar in other respects to the conventional one, so that detailed description will be omitted.

Figure 1:
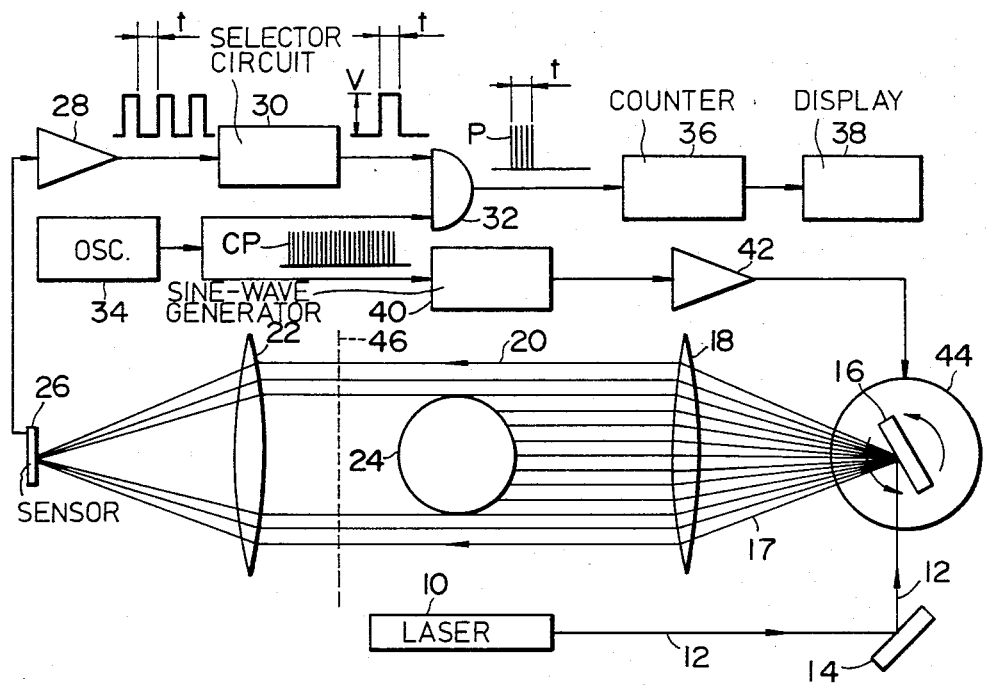
FIG. 1 is a plan view partially including a block diagram, showing an example of the arrangement of the conventional optical measuring device.
Figure 3:
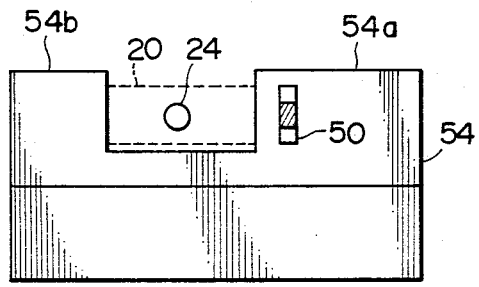
FIG. 3 is a front view showing the position where the setting position displayer is provided.

As shown in FIG. 3 for example, the aforesaid setting position displayer 50 is provided on a body 54a at the light receiving side of the optical measuring device 54 in directly opposed relations to the scanning scope of the parallel scanning ray beams 20. In FIG. 3, designated at 54b is a body at the light emitting side.

In the present embodiment, an output signal from the pre-amplifier 28 is time-sheared into the number n in accordance with the number of the light emitting elements n of the setting position displayer 50 in response to a clock pulse signal from the clock pulse oscillator 34. In consequence, in the setting position displayer 50, out of the light emitting element 50-1~50-n in opposed relations to the scanning scope of the parallel scanning ray beams 20, the light emitting element or elements being in opposed relations to the workpiece 24 with respect to the scanning scope of the parallel scanning ray beams 20 are turned "ON", and hence, the setting position of the workpiece being measured 24 with respect to the scanning scope of the parallel scanning ray beams 20 can be readily and quickly found from the turned-"ON" condition of the setting position displayer 50. In consequence, in a relative measurement or in measuring an oscillating body, it becomes possible to accurately set the workpiece being measured 24 at the center position in the scanning scope, a measurement with high accuracy can be effected irrespective of a deviation in dimensions between the workpieces being measured or the presence of vibrations of the workpiece being measured.

Figure 4:
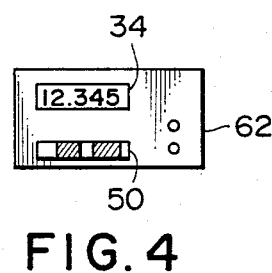
FIG. 4 is a front view showing a modified example of the position where the setting position displayer is provided.

In the present embodiment, the setting position displayer 50 is provided on the body 54a at the light receiving side of the optical measuring device in directly opposed relations to the scanning scope of the parallel scanning ray beams 20, so that the position of the workpiece being measured 24 with respect to the running scope of the parallel scanning ray beams 20 can be very easily found. In addition, the position, where the setting position displayer 50 is provided, need not necessarily be limited to this specific form, the setting position displayer 50 may be provided in parallel to the digital indicator 34 on an electric equipment indicator 62 provided separately of the main body of the optical measuring device as shown in FIG. 4 for example.

Additionally, in the present embodiment, only the light emitting element or elements are turned "ON" which are opposed to the position of the parallel scanning ray beams 20 obstructed by the workpiece being measured 24, however, the method of turning "ON" the light emitting element or elements need not necessarily be limited to this, but, when two or more measuring segments are present, all of the light emitting elements within the scope opposed to opposite end positions of the workpiece being measured can be turned "ON", for example.

Furthermore, in the present embodiment, only the opposed light emitting element or elements of the setting position displayer 50 are turned "ON" in response to an output from the time shearing circuit 52, however, as indicated by one-dot chain line in FIG. 2, the provision of a power amplifier 56 for amplifying the output from the aforesaid time shearing circuit 52 and a motor 60 for moving the position of a mount base 58, where the workpiece being measured 24 is mounted, makes it possible to feedback control the position of the mount base 58, so that the workpiece being measured 24 on the mount base 58 can come to a predetermined position, e.g., at the center position in the parallel scanning ray beams 20 in response to the output from the time-shearing circuit 52.

Further, in the above-described embodiment, the time shearing circuit 52 is provided independently of the segment selector circuit 30, however, a partial modification of the segment selector circuit 30 makes it possible to turn "ON" the opposed light emitting element or elements of the aforesaid setting position displayer 50 without needing to provide a separate time shearing circuit.

It should be apparent of those skilled in the art that the abovedescribed embodiments are merely representative, which represent the application of the principles of the present invention. Numerous and varied other arrangements can be readily devised by those skilled in the art without departing from the spirit and the scope of the invention.

What is claimed is:

1. An optical measuring device comprising a parallel scanning ray beam generator, condensing means for condensing said parallel scanning ray beams after said parallel scanning ray beams have passed through a workpiece being measured, and a single light receiving element for sensing the brightness of said scanning ray beams condensed by said condensing means to convert the same into an electric signal, whereby the dimensions of said workpiece being measured are measured from the time length of a dark portion or a bright portion generated due to the obstruction of said parallel scanning ray beams by said workpiece being measured, which has been interposed between said parallel scanning ray beam generator and said light receiving element, characterized in that said device further comprises setting position display means having a plurality of light emitting elements arranged in opposed relations to the scanning scope of said parallel scanning ray beams and a time shearing circuit for time-shearing an output from said light receiving element during a single scanning time in accordance with the number of the light emitting elements of said setting position display means to thereby cause the light emitting elements of said setting position display means in accordance with the position of the workpiece being measured with respect to the scanning scope to emit lights.

2. An optical measuring device as set forth in claim 1, wherein said parallel scanning ray beam generator includes a helium-neon laser beam source for generating uneasily visible laser beams.

3. An optical measuring device as set forth in claim 1, wherein said parallel scanning ray beam generator includes a semiconductor laser beam source for generating invisible laser beams.

4. An optical measuring device as set forth in claim 1, wherein said setting position display means is provided on a body at the light receiving side of said optical measuring device in directly opposed relations to the scanning scope of said parallel scanning ray beams.

5. An optical measuring device as set forth in claim 1, wherein said setting position display means is provided in parallel to a digital indicator on an electric equipment indicator provided separately of the main body of said optical measuring device.

6. An optical measuring device as set forth in claim 1, wherein, out of said plurality of light emitting elements, only the light emitting element or elements are turned "ON" which are opposed to the position of said parallel scanning ray beams obstructed by the workpiece being measured.

7. An optical measuring device as set forth in claim 1, wherein, out of said plurality of light emitting elements, all of the light emitting elements within the scope opposed to opposite end positions of the workpiece being measured are turned "ON".

8. An optical measuring device comprising a parallel scanning ray beam generator, condensing means for condensing parallel scanning ray beams after said parallel scanning ray beams have passed through a workpiece being measured, and a single light receiving element for sensing the brightness of said parallel scanning ray beams condensed by said condensing means and a segment selector circuit for time-shearing an output from said light receiving element to select a measuring segment, whereby the dimensions of said workpiece being measured are measured from the time length of a dark portion or a bright portion in said measuring segment generated due to the obstruction of said parallel scanning ray beams by said workpiece being measured, which has been interposed between said parallel scanning ray beam generator and said light receiving element, characterized in that said device further comprises setting position display means having a plurality of light emitting elements arranged in opposed relations to the scanning scope of said parallel scanning ray beams and a time shearing circuit utilizing the aforesaid segment selector circuit for time-shearing an output from said light receiving element during a single scanning time in accordance with the number of the light emitting elements of said setting position display means to thereby cause the light emitting elements or elements of said setting position display means to emit lights in accordance with the position of said workpiece being measured with respect to the scanning scope.

9. An optical measuring device comprising a parallel scanning ray beam generator, condensing means for condensing parallel scanning ray beams after said parallel scanning ray beams have passed through a workpiece being measured, and a single light receiving element for sensing the brightness of said parallel scanning ray beams condensed by said condensing means to convert same into an electric signal, whereby the dimensions of said workpiece being measured are measured from the time length of a dark portion or a bright portion generated due to the obstruction of said parallel scanning ray beams by said workpiece being measured, which has been interposed between said parallel scanning ray beam generator and said light receiving element, characterized in that said device further comprises driving means for moving the position of a mount base, on which said workpiece being measured is mounted, in the scanning direction of said parallel scanning ray beams, a time shearing circuit for time-shearing an output from said light receiving element during a signal scanning time to generate an output in accordance with the position of said workpiece being measured with respect to the scanning scope, and a power amplifier for feedback controlling the position of said mount base by means of said driving means, so that said workpiece being measured can come to a predetermined position within said parallel scanning ray beams in response to an output from said time shearing circuit.

* * * * *